United States Patent
Barabe et al.

(10) Patent No.: US 7,358,965 B2
(45) Date of Patent: Apr. 15, 2008

(54) TAPPING TO CREATE WRITING

(75) Inventors: Benoit Barabe, Snoqualmie, WA (US); Kentaro Urata, Kirkland, WA (US); Alex J. Simmons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 10/782,132

(22) Filed: Feb. 18, 2004

(65) Prior Publication Data

US 2005/0179648 A1    Aug. 18, 2005

(51) Int. Cl.
*G06F 3/33*    (2006.01)
*G06F 3/41*    (2006.01)
*G06K 11/06*    (2006.01)
*G06K 9/18*    (2006.01)

(52) U.S. Cl. .............. 345/179; 345/173; 178/18.01; 178/18.03; 382/181; 382/186; 382/189; 715/541

(58) Field of Classification Search ........ 345/156–184; 382/181–189; 178/18.01, 18.03; 715/541
See application file for complete search history.

(56) References Cited

U.S. PATENT DOCUMENTS

| | | | | |
|---|---|---|---|---|
| 5,063,600 A | * | 11/1991 | Norwood ............... | 345/173 |
| 5,231,698 A | * | 7/1993 | Forcier ................. | 345/179 |
| 5,390,281 A | | 2/1995 | Luciw et al. .......... | 395/12 |
| 5,404,442 A | | 4/1995 | Foster et al. .......... | 395/159 |
| 5,434,929 A | | 7/1995 | Beernink et al. ....... | 382/187 |
| 5,442,742 A | | 8/1995 | Greyson et al. ........ | 715/539 |
| 5,446,882 A | | 8/1995 | Capps et al. ........... | 707/104.1 |
| 5,465,325 A | | 11/1995 | Capps et al. ........... | 345/441 |
| 5,477,447 A | | 12/1995 | Luciw et al. ........... | 704/9 |
| 5,479,596 A | | 12/1995 | Capps et al. ........... | 715/539 |
| 5,491,495 A | | 2/1996 | Ward et al. ........... | 345/173 |
| 5,500,937 A | | 3/1996 | Thompson-Rohrlich ... | 715/764 |

(Continued)

FOREIGN PATENT DOCUMENTS

DE    40 26 852 A1    2/1991

(Continued)

OTHER PUBLICATIONS

Wilcox et al., "Dynomite: A Dynamically Organized Ink and Audio Notebook," Computer-Human Interaction, Mar. 27, 1997, pp. 186-193.

(Continued)

*Primary Examiner*—Bipin Shalwala
*Assistant Examiner*—David L. Lewis
(74) *Attorney, Agent, or Firm*—Merchant & Gould P.C.

(57) ABSTRACT

The present invention provides a method and system for tapping to create document structure, such as writing. A tapping gesture received from the user is interpreted by a writing application to indicate that the user is about to write in a certain location on the page. While in pen mode, the user taps the pen, the gesture recognizer tells the writing application that a "tap" has occurred, and the writing application creates a new paragraph with an active writing guide attached to it at that location. A tap below text creates a new paragraph. The new paragraph may be located at any available indent level depending on the location of the tap. The tapping gesture may also be used for clearing or moving selections.

24 Claims, 6 Drawing Sheets

U.S. PATENT DOCUMENTS

| | | | |
|---|---|---|---|
| 5,513,309 A | 4/1996 | Meier et al. | 715/860 |
| 5,517,578 A | 5/1996 | Altman et al. | 382/181 |
| 5,528,743 A * | 6/1996 | Tou et al. | 345/179 |
| 5,544,295 A | 8/1996 | Capps | 345/473 |
| 5,544,358 A | 8/1996 | Capps et al. | 715/523 |
| 5,555,363 A | 9/1996 | Tou et al. | 715/541 |
| 5,559,942 A | 9/1996 | Gough et al. | 715/802 |
| 5,579,467 A | 11/1996 | Capps | 715/507 |
| 5,583,542 A | 12/1996 | Capps et al. | 345/173 |
| 5,588,105 A | 12/1996 | Foster et al. | 715/779 |
| 5,590,257 A | 12/1996 | Forcier | 715/530 |
| 5,592,566 A | 1/1997 | Pagallo et al. | 382/187 |
| 5,594,640 A | 1/1997 | Capps et al. | 715/532 |
| 5,596,350 A | 1/1997 | Capps et al. | 345/173 |
| 5,596,694 A | 1/1997 | Capps | 345/473 |
| 5,596,697 A | 1/1997 | Foster et al. | 715/810 |
| 5,602,570 A | 2/1997 | Capps et al. | 345/173 |
| 5,613,019 A | 3/1997 | Altman et al. | 382/311 |
| 5,634,102 A | 5/1997 | Capps | 715/744 |
| 5,649,133 A | 7/1997 | Arquie | 715/764 |
| 5,655,136 A | 8/1997 | Morgan | 382/187 |
| 5,666,139 A * | 9/1997 | Thielens et al. | 345/173 |
| 5,666,552 A | 9/1997 | Greyson et al. | 715/539 |
| 5,671,438 A | 9/1997 | Capps et al. | 715/539 |
| 5,682,439 A | 10/1997 | Beernink et al. | 382/187 |
| 5,710,831 A | 1/1998 | Beernink et al. | 382/189 |
| 5,745,716 A | 4/1998 | Tchao et al. | 715/777 |
| 5,760,773 A | 6/1998 | Berman et al. | 715/808 |
| 5,764,818 A | 6/1998 | Capps et al. | 382/317 |
| 5,768,418 A | 6/1998 | Berman et al. | 382/187 |
| 5,778,404 A | 7/1998 | Capps et al. | 715/531 |
| 5,796,397 A | 8/1998 | Kusano | 715/804 |
| 5,809,498 A | 9/1998 | Lopresti et al. | 707/6 |
| 5,838,326 A | 11/1998 | Card et al. | 715/775 |
| 5,838,819 A | 11/1998 | Ruedisueli et al. | 382/187 |
| 5,864,635 A | 1/1999 | Zetts et al. | 382/187 |
| 5,867,150 A | 2/1999 | Bricklin | 345/173 |
| 5,874,957 A | 2/1999 | Cline et al. | 715/786 |
| 5,880,743 A | 3/1999 | Moran et al. | 345/473 |
| 5,953,735 A | 9/1999 | Forcier | 715/541 |
| 5,963,208 A | 10/1999 | Dolan et al. | 715/760 |
| 5,970,455 A | 10/1999 | Wilcox et al. | 704/270 |
| 6,020,895 A | 2/2000 | Azami | 345/619 |
| 6,021,218 A | 2/2000 | Capps et al. | 382/187 |
| 6,061,472 A | 5/2000 | Hullender et al. | 382/187 |
| 6,069,626 A | 5/2000 | Cline et al. | 715/786 |
| 6,081,829 A | 6/2000 | Sidana | 709/203 |
| 6,108,445 A | 8/2000 | Uehara | 382/189 |
| 6,128,007 A | 10/2000 | Seybold | 345/179 |
| 6,128,633 A | 10/2000 | Michelman et al. | 715/525 |
| 6,154,219 A | 11/2000 | Wiley et al. | 345/587 |
| 6,154,758 A | 11/2000 | Chiang | 715/541 |
| 6,188,405 B1 | 2/2001 | Czerwinski et al. | 715/764 |
| 6,223,145 B1 | 4/2001 | Hearst | 703/22 |
| 6,243,258 B1 | 6/2001 | Paratore | 361/680 |
| 6,279,014 B1 | 8/2001 | Schilit et al. | 715/512 |
| 6,295,372 B1 | 9/2001 | Hawkins et al. | 382/187 |
| 6,304,272 B1 | 10/2001 | Schanel et al. | 345/676 |
| 6,337,698 B1 | 1/2002 | Keely, Jr. et al. | 715/823 |
| 6,340,967 B1 | 1/2002 | Maxted | 345/179 |
| 6,345,389 B1 | 2/2002 | Dureau | 725/116 |
| 6,348,935 B1 | 2/2002 | Malacinski et al. | 715/853 |
| 6,355,889 B1 | 3/2002 | Butcher | 178/18.03 |
| 6,380,957 B1 | 4/2002 | Banning | 715/828 |
| 6,487,567 B1 | 11/2002 | Michelman et al. | 715/525 |
| 6,487,569 B1 | 11/2002 | Lui et al. | 715/530 |
| 6,529,215 B2 | 3/2003 | Golovchinsky et al. | 715/764 |
| 6,565,611 B1 | 5/2003 | Wilcox et al. | 715/541 |
| 6,594,390 B2 | 7/2003 | Frink et al. | 382/187 |
| 6,650,347 B1 | 11/2003 | Nulu et al. | 715/853 |
| 6,651,221 B1 | 11/2003 | Thompson et al. | 715/541 |
| 6,654,035 B1 | 11/2003 | DeStefano | 715/798 |
| 6,661,409 B2 | 12/2003 | Demartines et al. | 345/173 |
| 6,678,865 B1 | 1/2004 | Pratley et al. | 715/509 |
| 6,681,045 B1 | 1/2004 | Lapstun et al. | 382/187 |
| 6,683,600 B1 | 1/2004 | Lui | 345/179 |
| 6,690,364 B1 | 2/2004 | Webb | 345/173 |
| 6,727,927 B1 | 4/2004 | Dempski et al. | 715/853 |
| 6,741,749 B2 | 5/2004 | Herbert, Jr. | 382/246 |
| 6,801,190 B1 | 10/2004 | Robinson et al. | 345/173 |
| 6,833,827 B2 | 12/2004 | Lui et al. | 345/173 |
| 6,836,759 B1 | 12/2004 | Williamson et al. | 704/235 |
| 6,989,822 B2 | 1/2006 | Pettiross et al. | 345/179 |
| 7,002,560 B2 | 2/2006 | Graham | 345/179 |
| 7,039,234 B2 | 5/2006 | Geidl et al. | 382/187 |
| 7,055,110 B2 | 5/2006 | Kupka | 715/863 |
| 7,079,713 B2 | 7/2006 | Simmons | 382/321 |
| 7,096,432 B2 * | 8/2006 | Huapaya et al. | 715/863 |
| 2001/0000960 A1 | 5/2001 | Dettloff | 343/748 |
| 2002/0078035 A1 | 6/2002 | Frank et al. | 707/3 |
| 2002/0097270 A1 | 7/2002 | Keely et al. | 345/764 |
| 2002/0126153 A1 | 9/2002 | Withers et al. | 345/773 |
| 2003/0071850 A1* | 4/2003 | Geidl | 345/781 |
| 2003/0085931 A1 | 5/2003 | Card et al. | 345/853 |
| 2003/0119469 A1 | 6/2003 | Karr et al. | 455/307 |
| 2003/0214491 A1 | 11/2003 | Keely et al. | 345/179 |
| 2003/0214531 A1 | 11/2003 | Chambers et al. | 345/764 |
| 2003/0215142 A1 | 11/2003 | Gounares | 382/190 |
| 2004/0003350 A1 | 1/2004 | Simmons et al. | 715/517 |
| 2004/0021701 A1 | 2/2004 | Iwema et al. | 345/863 |
| 2004/0060000 A1* | 3/2004 | Jaeger | 715/502 |

FOREIGN PATENT DOCUMENTS

| | | |
|---|---|---|
| EP | 0 460 420 A3 | 12/1991 |
| EP | 1 450 294 A1 | 8/2004 |
| EP | 1 486 883 A2 | 12/2004 |
| JP | 3-270403 | 12/1991 |

OTHER PUBLICATIONS

Jakobsen, T., "Advanced Character Physics," Game Developer's Conference, 2001 Proceedings, pp. 1-17.

Fitzmaurice et al., "Tracking Menus," CHI 2003, vol. 5, No. 2, pp. 71-80, 2003.

* cited by examiner

TAPPING TO CREATE WRITING

BACKGROUND OF THE INVENTION

Some personal computers allow a user to "write" on their computer display much as they would write on their notepad. One such computer is a tablet PC which typically includes the functionality of a laptop computer but including more input features. For example, a tablet PC allows multimodal input in which a user can input information into the tablet by writing on the touch screen with a pen, using a keyboard, or even using their voice. A user can take notes just as they would using traditional pen and paper. Handwriting recognition allows the user's handwriting to be converted into digital text. It is sometimes difficult, however, to distinguish between handwriting and drawing input.

SUMMARY OF THE INVENTION

The present invention is directed towards a method and system for tapping to create document structure.

According to one aspect of the invention, a tap from the user is used to indicate to a writing application that the user is about to write in a certain location on the page. While in pen mode, the user taps the pen, the gesture recognizer tells the writing application that a "tap" has occurred, and the writing application creates a new paragraph with an active writing guide attached to it at that location.

According to another aspect of the invention, when writing is already present, a tap after the existing writing creates a new paragraph. The new paragraph may be located at an indent level relative to the writing depending on the location of the tap.

According to yet another aspect of the invention, a tap from the user is used to indicate to a writing application that the user is about to draw in a certain location on the page.

DETAILED DESCRIPTION OF THE PREFERRED EMBODIMENT

Generally, the present invention is directed towards a method and system for tapping to create document structure. A tap received from a user is interpreted by a writing application to indicate that the user is about to write in a certain location on the page. According to another embodiment, the tap is used to indicate to the writing application that the user is about to draw in a certain location on the page. While in pen mode, the user taps the pen, the gesture recognizer tells the writing application that a "tap" has occurred, and the writing application creates a new paragraph with an active writing guide attached to it at that location. A tap below the text creates a new paragraph. The new paragraph may be located at any available indent level based on the location of the tap. While the examples presented herein primarily refer to tapping to create writing, the tapping may also be used to indicate to an application to create any type of document structure. For example, the tapping may be used to indicate to the application to create a drawing near the location of the tap.

Illustrative Operating Environment

Figure 1:
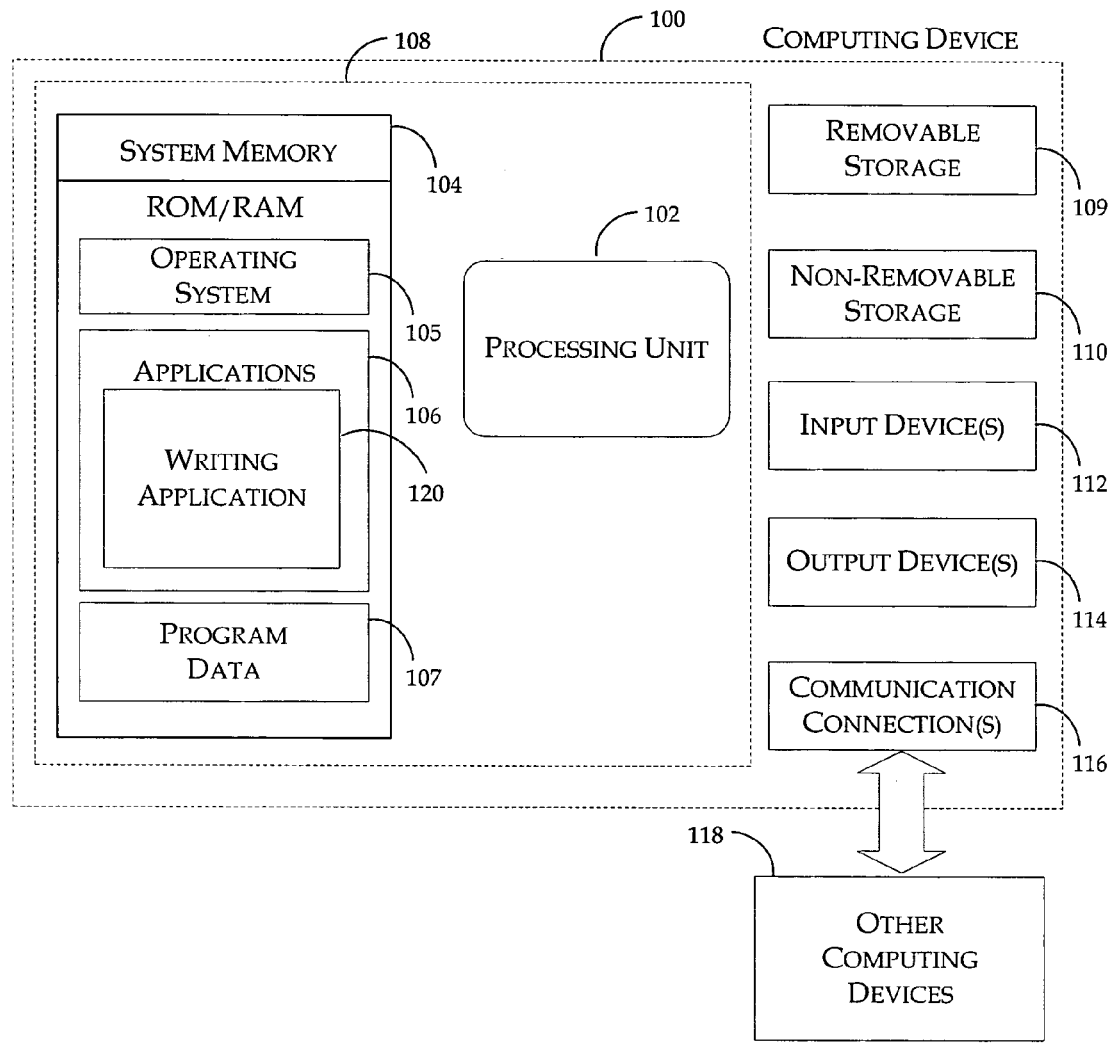
FIG. 1 illustrates an exemplary computing devices that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A pen and ink interface allows a user to enter writing directly on the touch screen. In one embodiment, application 106 may include a writing application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 also includes input device(s) 112 such as a touch screen input device, a stylus (pen), voice input device (speech recognition), an on-screen keyboard and writing pad, keyboard, mouse, etc. For example, a user could use the pen and writing pad to input their handwritten text into applications, and/or use the pen with the on-screen keyboard. Computing device 100 may also include Output device(s) 114 such as an external display, speakers, printer, etc. may also be included.

Computing device 100 may also contain communication connections 116 that allow the device to communicate with other computing devices 118, such as over a network. An exemplary communications connection is a wireless interface layer that performs the function of transmitting and receiving wireless communications. The wireless interface layer facilitates wireless connectivity between computing device 100 and the outside world. According to one embodiment, transmissions to and from the wireless interface layer are conducted under control of the operating system.

Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Tapping to Create Writing Guides

Figure 2:
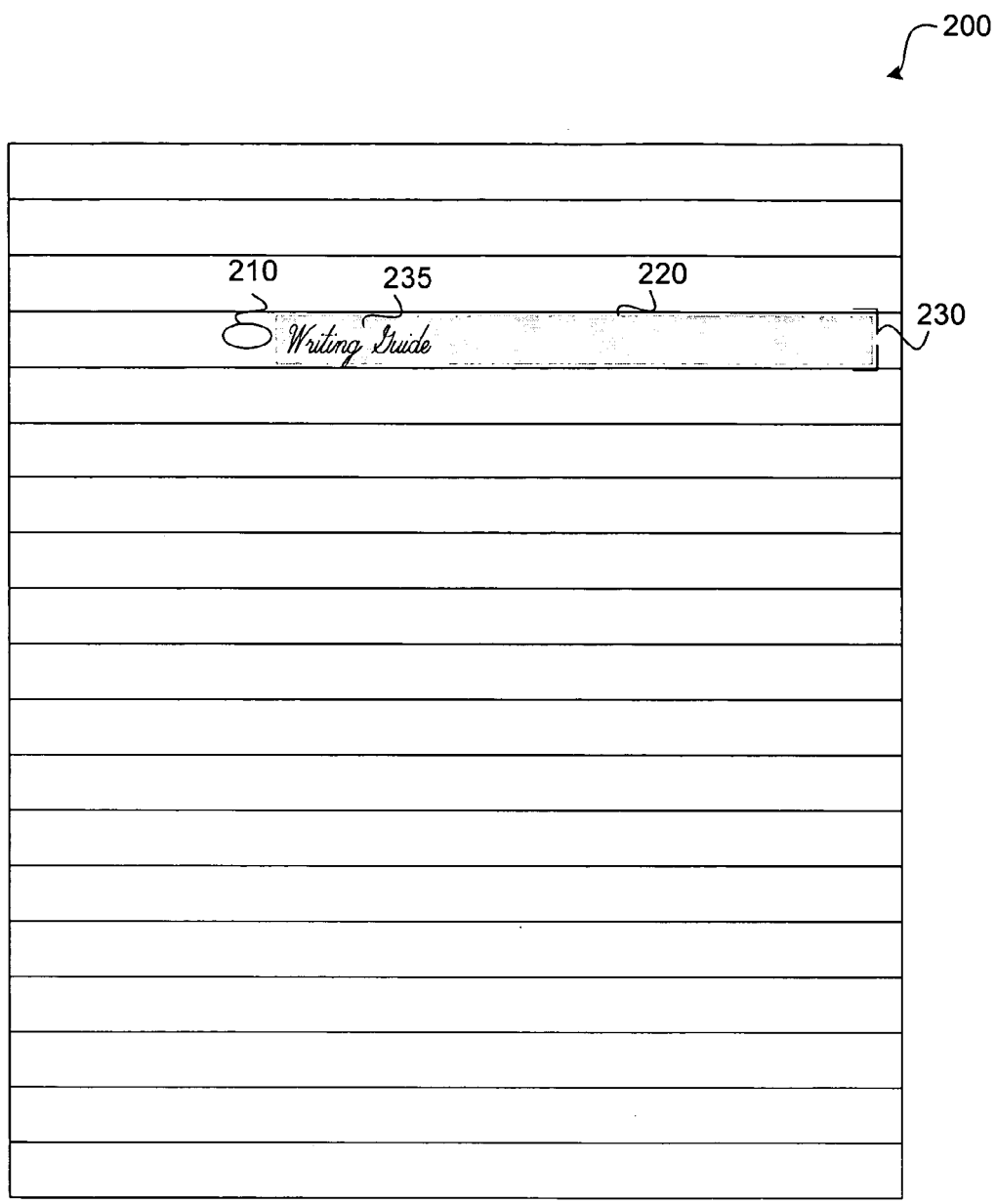
FIG. 2 shows an exemplary screen including a handwriting guide.

FIG. 2 shows an exemplary screen including a handwriting guide, in accordance with aspects of the invention. As shown, screen 200 includes, node handle 210, writing guide 220, current line guides 230, and writing 235.

A handwriting guide is a user interface element for creating structured handwritten notes. Generally, a handwriting guide is created when a user taps in a location where there is no other content. In other words, a handwriting guide is created when the user taps on an empty part of the screen where no other writing ink, drawing ink, or menus are located. In the present example, writing guide 220 appeared after a user tapped their pen on an empty location of screen 200 near the location of where node handle 210 currently is shown.

The handwriting guide serves two main purposes. First, the handwriting guide provides the user confirmation that the new ink will be considered handwriting and not a drawing. Second, the handwriting guide helps the user to write in a more controlled fashion. Guide 220 assists the user to write horizontally in straight lines instead of at arbitrary angles at the edge of the page and in widely varying sizes. Guide 220 also helps to ensure that handwritten words have more consistent and recognizable base lines. As a result, the user creates handwriting that is more recognizable by the writing application.

The handwriting guide appears after the user taps at a location on the screen that does not have content. As the user continues to write and create more written structure, the guide shows the user the structure they have created in their document, and where they can write to add onto the structure or start a new document structure. As they work through their document, the guides indicate the size and shape of their paragraph, changing size to indicate indent levels and multiple line paragraphs. While the use of guides provides many benefits to the writing experience, the use of the guides is optional.

Figure 3:
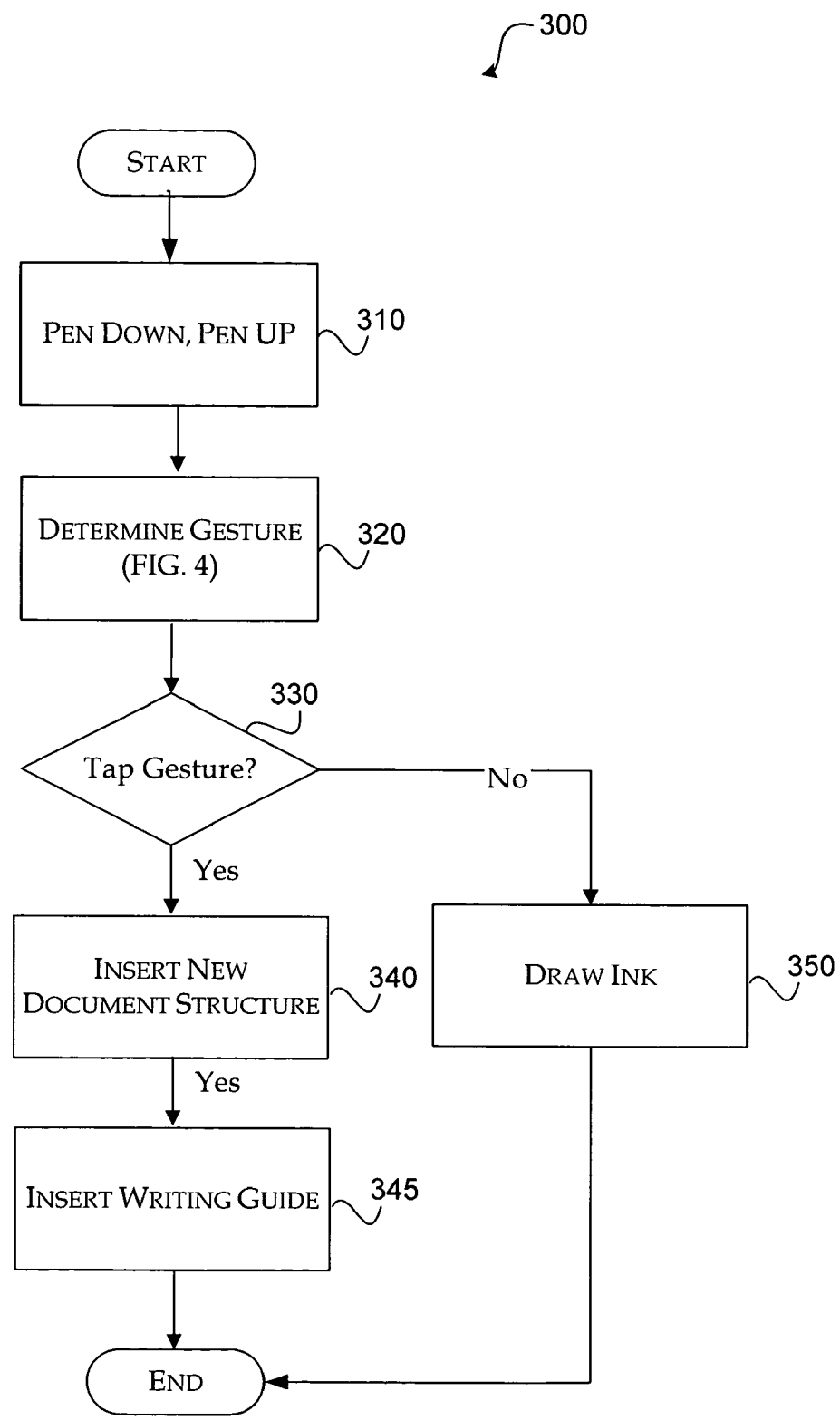
FIG. 3 shows a process for tapping to create document structure.

FIG. 3 shows a process for tapping to create document structure, in accordance with aspects of the present invention.

After a start block, the process moves to block 310, where the user places the pen down on the touch screen and the raises the pen up off of the touch screen.

Moving to block 320, a determination is made to identify the gesture. Generally, the gesture is considered a tap when the user places the pen down on the screen for a short period of time within a small dimension of the screen (See FIG. 4).

Flowing to decision block 330, a determination is made as to whether the gesture is considered a tap.

When the gesture is a tap, the process moves to block 340 where new document structure is inserted. According to one embodiment, the tap is used to indicate that writing will be created. According to another embodiment, the tap is used to indicate that a drawing will be created.

According to one embodiment, the process moves to block 345 where a writing guide is inserted. According to one embodiment of the invention, the writing guide may be inserted at the location of the tap, or at the appropriate indent level. For example, when a tap is located directly below the left edge of the text on the screen, then the writing guide is inserted on the next available writing line with no indentation. When the tap is offset from the writing guide and below the existing text, then the writing guide is placed at the appropriate indent level. The process then moves to an end block.

When the gesture is not a tap, the process moves to block 350 where ink is drawn. The process then moves to an end block.

Figure 4:
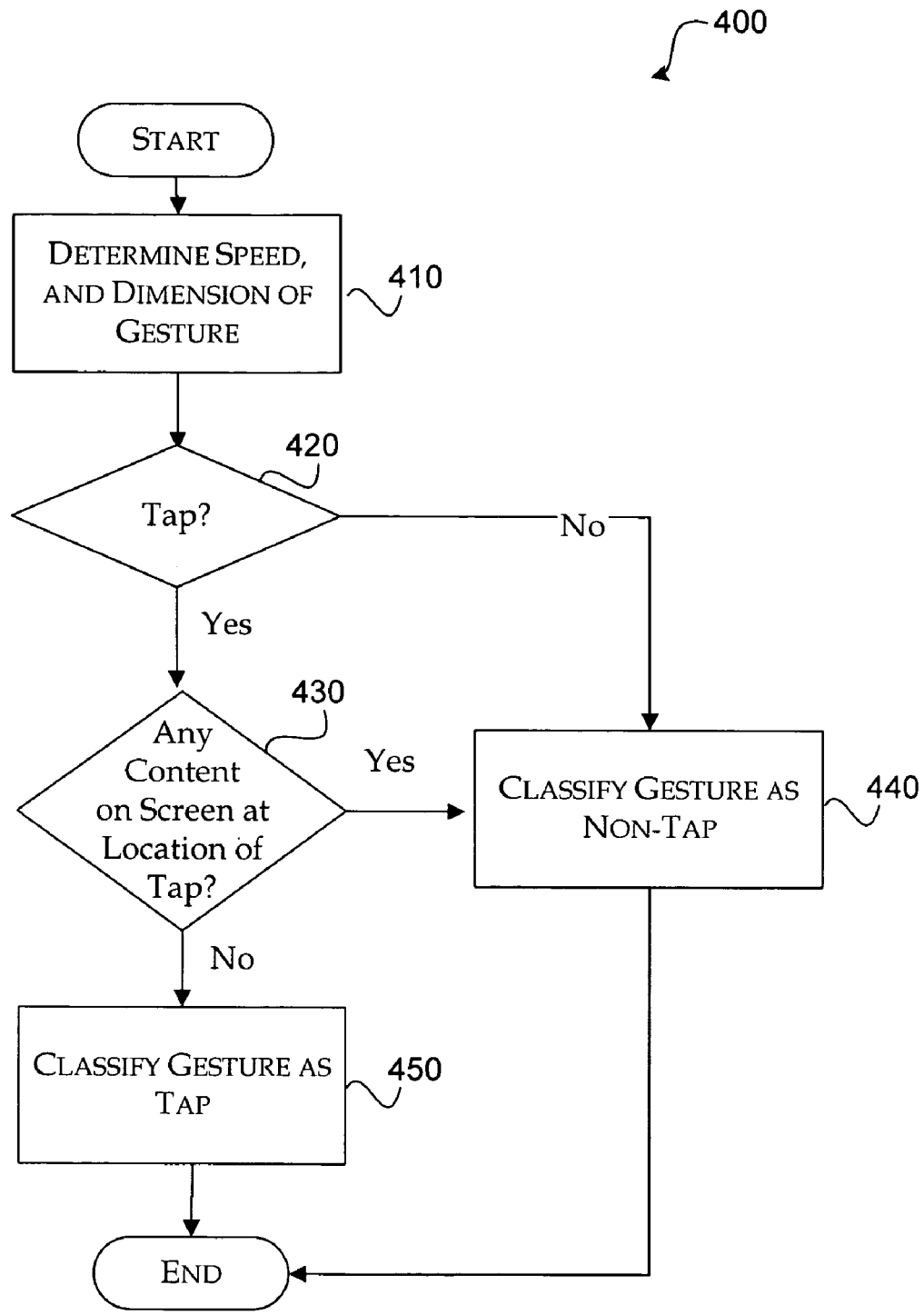
FIG. 4 illustrates a process for determining a tap.

FIG. 4 illustrates a process for determining a tap, in accordance with aspects of the invention. After a start block, the process moves to block 410 where the speed and dimension of the gesture is determined. The speed and dimension of the gesture determine whether the gesture may be classified as a tapping gesture. For example, the dimension of the tap may indicate a dash (-). The speed of the gesture helps to determine if the pen was placed briefly down on the screen.

Moving to decision block 420, a determination is made as to whether the gesture may initially be classified as a tap based on the speed and dimension of the gesture.

When the gesture is initially classified as a tap, the process moves to decision block 430 to determine if there is any content on the screen at the location of the tap.

When there is content at the tap location the process moves to block 440 and the gesture is classified as a non-tap. For example, the tapping gesture may be located over a menu. The process then moves to an end block.

When there is no content at the location of the tap, the process moves to block 450, where the gesture is classified as a tap. The process then moves to an end block.

Figure 5:
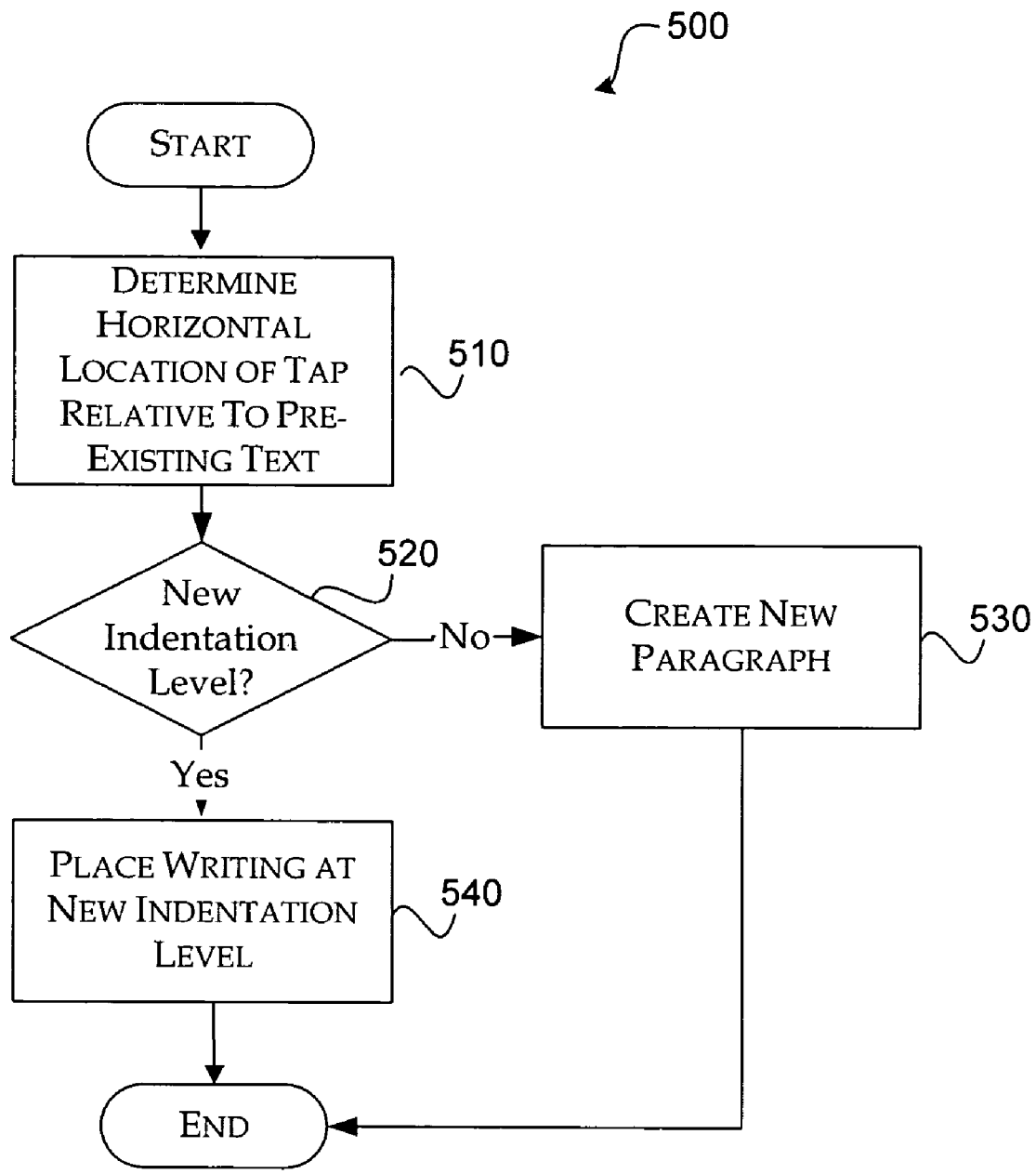
FIG. 5 illustrates a process for placing a writing guide at an indention level using a tap.

FIG. 5 illustrates a process for placing a writing guide at an indention level using a tap, in accordance with aspects of the invention.

After a start block, the process flows to block 510 where the horizontal offset of the tap is determined relative to the horizontal location of the pre-existing writing start location of the writing. According to one embodiment of the invention, the left hand side of the existing writing directly above the tap is used as the starting horizontal location. For right-to-left languages, the right hand side could be used.

Transitioning to decision block 520, a determination is made as to whether the tap is located at a new indentation level. Indentation levels may be based on any predetermined horizontal offset (the "indent distance") between the tap and the existing text. For example, the indentation levels could be set at half inch intervals. According to one embodiment, tapping into an indent level for the first time sets the indent distance for that level for the rest of the writing. After an indent level is established, a small amount of ink overlap with the space that occupies the previous level is allowed. Too much overlap, however, and the indent goes to the next higher level. According to one embodiment, the indent distance is set to be at the left most point of the first ink stroke drawn into that level minus 0.1 times the current line height.

When the difference is less than the indent distance, the process moves to block 530 where a new paragraph is created by inserting the writing directly underneath the pre-existing writing without any offset. The process then moves to an end block.

When the difference is greater than or equal to the indent distance, the process flows to block 540 where writing is placed at the new indention level. The process then moves to an end block.

Figure 6:
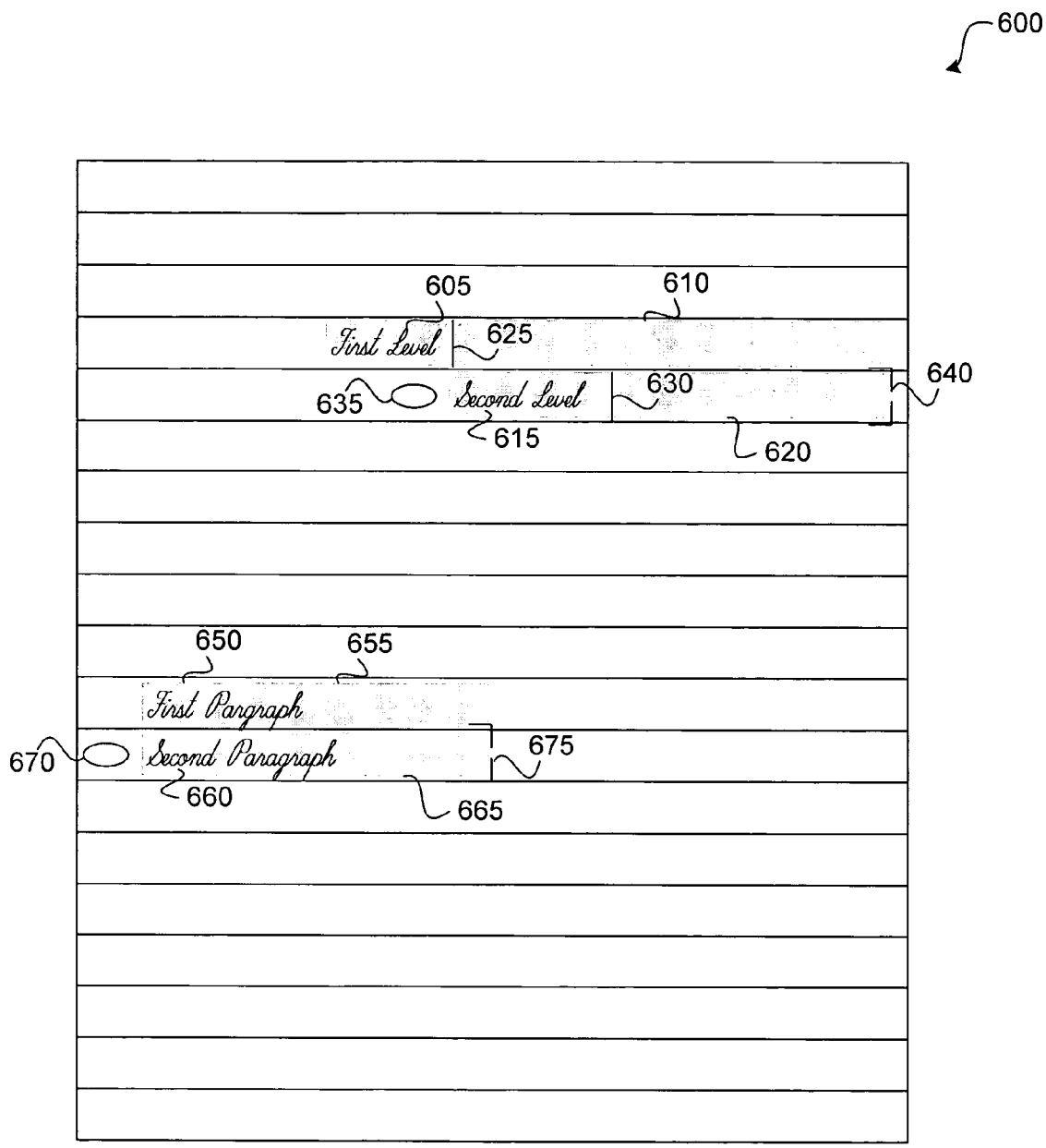
FIG. 6 shows an exemplary screen with writing locations indicated using a tap, in accordance with aspects of the invention.

FIG. 6 shows an exemplary screen with writing locations indicated using a tap, in accordance with aspects of the invention.

Structured text is shown with writing 605 and writing 615. In this example, the writing guides are shown with optional next indent level indicators 625 and 630. Indent level indicator 625 shows the user where to tap to create a second level writing guide and indicator 630 shows the user where to tap to create a third level writing guide. Node handle 635 and current line guides 640 indicate that the second level is the current writing level for the text. As can be seen, active writing guide 620 is indented from first level writing guide 610. The user may extend the indentation level by tapping on the line after second level writing guide 620. The indent level may be increased or decreased based on the location of the tap. According to one embodiment, as indent levels are established, subsequent indent level indicators automatically line up with previous indents within the text to correct for user error.

When the user taps on text, then the tap gesture is recognized by the gesture recognizer as a left click. This allows the user to move or clear the text.

Text 650 and text 660 show two paragraphs created by tapping. Node handle 670 and current line guides 675 show the user the active writing line. In this example, writing guide 655 and active writing guide 665 are at the same indentation level. When the user initially taps on an empty screen, the writing guide is placed at the first level. For the next line, the user can either tap into the first level, or start a new level. If text is already present, a tap below the text creates a new paragraph, which could be at any available indent level.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for indicating writing on a screen, comprising:
  receiving a gesture from a user;
  determining whether the gesture is a tap; and when the gesture is a tap:
    determining a location on the screen associated with the tap;
    classifying the tap as a non-tap when there is content at the location on the screen that is associated with the tap;
    determining whether the location on the screen is without content; and when the location on the screen is without content:
      determining that the tap indicates to create a document structure on the screen; and
      inserting a handwriting guide based on the location of the screen that is associated with the tap.

2. The method of claim 1, wherein determining that the tap indicates to create the document structure on the screen further comprises determining that the tap indicates to create a drawing on the screen.

3. The method of claim 2, further comprising creating a first level of writing approximately at the location of the tap when the tap indicates writing on the screen.

4. The method of claim 2, wherein determining whether the gesture is the tap, further comprises determining a speed and a dimension associated with the gesture.

5. The method of claim 3, further comprising creating a second level of writing when the tap location is within a predetermined distance of the first level of writing.

6. The method of claim 5, further comprising calculating an indent distance based on the tap location relative to a location of the start of the first level of writing.

7. The method of claim 6, further comprising indenting the second level of writing when the tap location is near the indent distance.

8. The method of claim 5, further comprising indenting the second level when the tap location is approximately near a predetermined indent level.

9. A computer-readable medium having computer executable instructions for determining writing on a screen, the instructions comprising:
  receiving a gesture;
  determining a location on the screen associated with the gesture;
  classifying the gesture as a non-tap when there is content at the location on the screen that is associated with the tap;
  determining whether the location on the screen is without content when the gesture is a tap; and when the location on the screen is without content:
    determining tat the tap indicates to create a document structure on the screen; and
    starting a new line of text near the location of the screen that is associated with the tap.

10. The computer-readable medium of claim 9, wherein determining that the tap indicates to create the document structure further comprises determining that the tap indicates to create writing on the screen.

11. The computer-readable medium of claim 10, further comprising creating a first level of writing approximately at the location of the tap when the tap indicates writing on the screen.

12. The computer-readable medium of claim 10, further comprising determining whether the gesture is the tap by determining a speed and a dimension associated with the gesture.

13. The computer-readable medium of claim 11, further comprising creating a second level of writing when the tap location is within a predetermined distance of the first level of writing.

14. The computer-readable medium of claim 12, further comprising calculating an indent distance based on the tap location relative to a location of the start of the first level of writing.

15. The computer-readable medium of claim 14, further comprising indenting a second level of writing when the tap location is near the indent distance and below the first level of writing.

16. The computer-readable medium of claim 13, further comprising indenting the second level when the tap location is approximately near a predetermined indent level.

17. A system for determining writing on a screen, comprising:
  a screen configured to receive pen input;
  a gesture recognizer configured to receive a gesture and determine when the gesture is a tap; and
  an application configured to perform actions, including:

receiving the tap from the gesture recognizer;

determining a location on the screen associated with the tap;

classify the tap as a non-tap when there is content at the location on the screen that is associated with the tap;

determining whether the location on the screen is without content; and when the location on the screen is without content:

determining that the tap indicates to create a document structure on the screen; and placing a writing guide near the location on the screen that is associated with the tap.

18. The system of claim 17, wherein determining that the tap indicates to create the document structure on the screen further comprises determining that the tap indicates to create writing on the screen.

19. The system of claim 18, further comprising creating a first level of writing approximately at the location of the tap when the tap indicates writing on the screen.

20. The system of claim 19, wherein the gesture recognizer is further configured to determine whether the gesture is the tap by determining a speed and a dimension associated with the gesture.

21. The system of claim 19, further comprising creating a second level of writing when the tap location is within a predetermined distance of the first level of writing.

22. The system of claim 19, further comprising calculating an indent distance based on the tap location relative to a location of the start of the first level of writing.

23. The system of claim 22, further comprising indenting a second level of writing when the tap location is near the indent distance and below the first level of writing.

24. The system of claim 23, further comprising indenting the second level when the tap locution is approximately near a predetermined indent level.

* * * * *

UNITED STATES PATENT AND TRADEMARK OFFICE
CERTIFICATE OF CORRECTION

| | | |
|---|---|---|
| PATENT NO. | : 7,358,965 B2 | Page 1 of 1 |
| APPLICATION NO. | : 10/782132 | |
| DATED | : April 15, 2008 | |
| INVENTOR(S) | : Benoit Barabe et al. | |

It is certified that error appears in the above-identified patent and that said Letters Patent is hereby corrected as shown below:

In column 6, line 31, in Claim 9, delete "tat" and insert -- that --, therefor.

In column 7, line 4, in Claim 17, delete "classify" and insert -- classifying -- , therefor.

In column 8, line 16, in Claim 24, delete "locution" and insert -- location --, therefor.

Signed and Sealed this

Fifteenth Day of February, 2011

David J. Kappos
*Director of the United States Patent and Trademark Office*